No. 897,484. PATENTED SEPT. 1, 1908.
P. PFORR.
PNEUMATIC CONTROL SYSTEM.
APPLICATION FILED APR. 19, 1907.
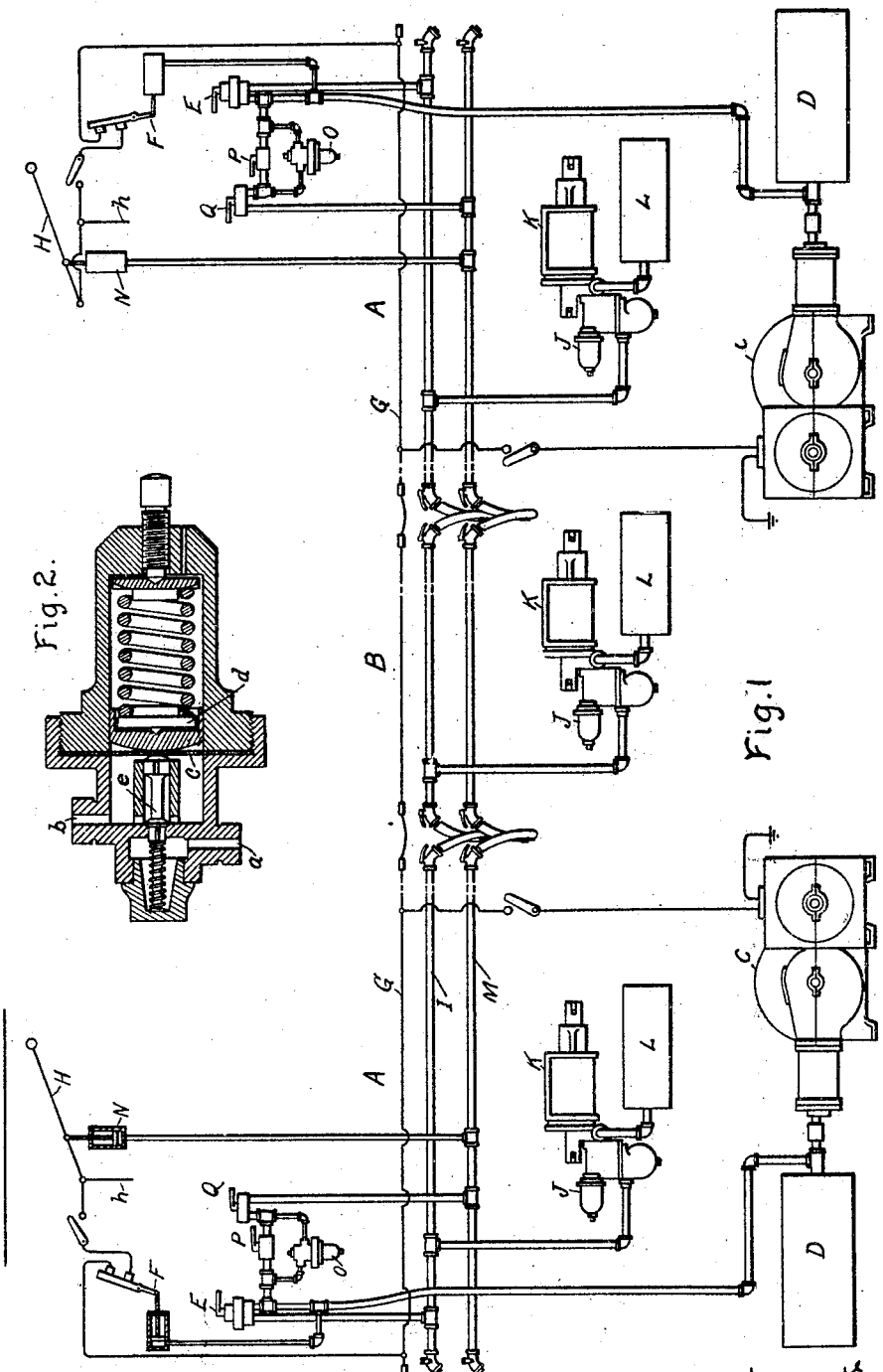
Witnesses:
Irving E. Steers.
Ellis Ellen
Inventor:
Philipp Pforr
by Albert G. Davis
Atty.

UNITED STATES PATENT OFFICE.

PHILIPP PFORR, OF BERLIN, GERMANY, ASSIGNOR TO GENERAL ELECTRIC COMPANY, A CORPORATION OF NEW YORK.

PNEUMATIC CONTROL SYSTEM.

No. 897,484.  Specification of Letters Patent.  Patented Sept. 1, 1908.

Application filed April 19, 1907. Serial No. 369,045.

*To all whom it may concern:*

Be it known that I, PHILIPP PFORR, a subject of the Emperor of Germany, residing at Berlin, Germany, have invented certain new and useful Improvements in Pneumatic Control Systems, of which the following is a specification.

My invention relates to control systems for trains of motor-driven cars,—or in other words, to trains operated on the multiple-unit system. When main reservoirs are used on all or on several of the cars of the train, it is ordinarily desirable to employ, in addition to the usual train-pipe for the air-brake system, a reservoir-pipe for equalizing the pressures in the several main reservoirs of the train. It is also frequently desirable to employ on the several cars pneumatically-operated devices controllable from a single point on the train,—for instance, the current-collecting devices on the several cars may be pneumatically operated; in which case it is desirable that they should be under the control of the motorman on the front car. With the arrangements employed heretofore, this necessitates a third pipe-line.

My invention broadly consists in employing the reservoir-pipe for actuating the pneumatically-operated devices on the cars. To secure this result, I provide a manually-controlled valve for varying the pressure in the reservoir-pipe and automatic valves for disconnecting the reservoirs from the reservoir-pipe when the pressure in the pipe falls below a predetermined limit.

My invention will best be understood by reference to the accompanying drawings, in which Figure 1 shows diagrammatically a pneumatic control system arranged in accordance with my invention; and Fig. 2 shows a cross-sectional view of an automatic valve.

In Fig. 1 I have indicated diagrammatically a train of three cars, A A representing motor-cars, and B a trailer placed between the two motor-cars. C C represent motor-driven compressors on the motor-cars supplying the main reservoirs D D. Each reservoir D is connected to a motorman's valve E of the usual construction, and also to an air-pump governor indicated diagrammatically at F. The governor F is connected through a cut-out switch to the current-collecting device H. When the cut-out switch is closed and the governor contacts are closed, the current-collecting device H is connected to a train-wire G supplying the several compressor-motors. The motor-circuit on the motor-cars is indicated by the conductor $h$; the motors themselves not being shown. The motorman's valve E is connected in the usual manner to the train-pipe I, to which are connected on the several cars the triple valves J controlling the connections for the brake-cylinders K and auxiliary reservoirs L. M represents the reservoir-pipe for equalizing the pressures in the several main reservoirs. To this pipe are connected the pneumatically-operated actuating means N for the current-collecting devices H. By raising the pressure in the reservoir-pipe M the current-collecting devices are raised into engagement with the working conductor. The connection from each main reservoir to the reservoir-pipe M passes through an automatic valve O provided with a manually-controlled by-pass P, and through a manually-operated valve Q, which is arranged to connect the reservoir-pipe M to the automatic valve O, or to disconnect it from the automatic valve and connect it to atmosphere to lower its pressure.

The construction of the automatic valve O is shown in Fig. 2. This valve has a port $a$ leading to the main reservoir, and a port $b$ leading through the valve Q to the reservoir-pipe M. The port $b$ opens into a chamber closed at one end by a diaphragm $c$, against which presses the spring-actuated piston $d$. When the pressure in the reservoir-pipe is below a certain amount, the diaphragm $c$ presses against the spindle of a valve $e$, which, when closed, disconnects port $b$ from port $a$, and consequently disconnects the reservoir-pipe from main reservoir. When the pressure in the reservoir-pipe is raised above a certain amount, this pressure, entering at the port $b$, presses back the diaphragm $c$ and piston $d$, allowing the valve $e$ to be unseated by the light spring which tends to move it toward the right. Connection is thereby established between the reservoir-pipe and main reservoir.

To put the system, as shown, into operation, the reservoir-pipe M is connected to any suitable source of air-pressure, so as to actuate the devices N and raise the current-collecting device H into engagement with the working conductor; or the train-wire G is connected to any suitable source of current, thereby starting the compressors C into operation, raising the pressures in the reservoirs, and in the reservoir-pipe until the current-collecting devices H are brought into engagement with the working conductor. All the by-passes P are closed, with the exception of the by-pass on the front car of the train; all the valves Q being in position to connect the automatic valves O with the reservoir-pipe. When in operation it is desired to lower the contact devices H away from the working conductor, the valve Q on the front car is moved to disconnect the reservoir-pipe from the automatic valve O and to open it to atmosphere. The reduction of pressure in the reservoir-pipe causes the lowering of the contact devices H, and as soon as the pressure in the reservoir-pipe falls below a certain amount the automatic valves O act to disconnect the reservoirs from the reservoir-pipe, and so prevent a waste of compressed air. To return the devices H into contact with the working conductor, the valve Q is returned to its normal running position.

What I claim as new and desire to secure by Letters Patent of the United States, is,—

1. In a train of motor-driven cars, in combination with an air-brake system having main reservoirs on a plurality of cars, a reservoir-pipe for equalizing the pressures in the several reservoirs, contact devices in the motor circuits, and pneumatically-operated actuating means therefor connected to said reservoir-pipe.

2. In a train of motor-driven cars, in combination with an air-brake system having main reservoirs on a plurality of cars, a reservoir-pipe for equalizing the pressures in the several reservoirs, a manually-operated valve controlling the pressure in said reservoir-pipe, contact devices in the motor circuits, and actuating means therefor responsive to variations of pressure in the reservoir-pipe.

3. In a train of motor-driven cars, in combination with an air-brake system having main reservoirs on a plurality of cars, a reservoir-pipe for equalizing the pressures in the several reservoirs, a manually-operated valve controlling the pressure in said reservoir-pipe, automatic valves adapted to disconnect the reservoirs from the reservoir-pipe upon a predetermined fall of pressure in said pipe, contact devices in the motor circuits, and actuating means therefor responsive to variations of pressure in said reservoir-pipe.

4. In a train of motor-driven cars, in combination with an air-brake system having main reservoirs on the several cars, a reservoir-pipe for equalizing the pressures in the several reservoirs, a manually-operated valve controlling the pressure in said reservoir-pipe, automatic valves adapted to disconnect the reservoirs from the reservoir-pipe upon a predetermined fall of pressure in said pipe, manually-controlled by-passes for said automatic valves, contact devices in the motor circuits, and actuating means therefor responsive to variations of pressure in said reservoir-pipe.

In witness whereof, I have hereunto set my hand this 6th day of April, 1907.

PHILIPP PFORR.

Witnesses:
MAX HAMBURGER,
JULIUS RÜMLAND.